United States Patent Office 2,885,390
Patented May 5, 1959

2,885,390
POLYAZO-DYESTUFFS

Richard Huss, Arthur Siebert, and Josef Weissert, Frankfurt am Main, Germany, assignors to Farbwerke Hoechst Aktiengesellschaft vormals Meister Lucius & Bruning, Frankfurt am Main, Hochst, Germany, a company of Germany No Drawing. Application June 29, 1953
Serial No. 364,910

Claims priority, application Germany July 2, 1952

5 Claims. (Cl. 260—144)

The present invention relates to new polyazo-dyestuffs; more particularly it relates to the polyazo-dyestuffs corresponding to the following general formula

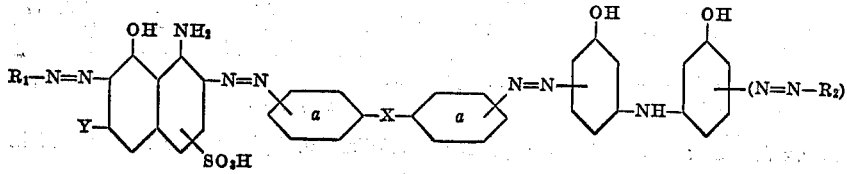

wherein $R_1$ and $R_2$ represent aromatic radicals, X stands for the diphenyl bond
—CH=CH—, —NH—CO—NH—, —CO—, —O—, —S—, —NH— or —CONH—, Y represents hydrogen or the sulfonic acid group, and wherein the phenyl radicals $a$ may contain substituents.

We have found that new valuable polyazo-dyestuffs corresponding to the general constitution

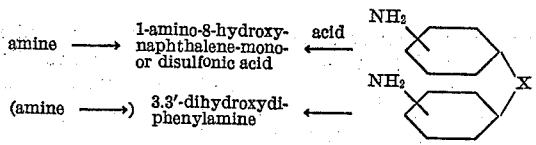

are obtained by coupling 1 molecular proportion of a tetrazotized diamine of the general formula

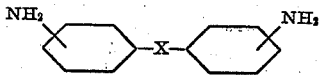

in which X has the meaning indicated above and the two phenyl radicals may contain substituents, in an acid medium with 1 molecular proportion of a 1-amino-8-hydroxynaphthalene-mono- or disulfonic acid and combining the diazoazo-compound thus obtained with 1 molecular proportion of any diazo- or diazoazo-compound and 1 molecular proportion of 3.3′-dihydroxydiphenylamine. The resulting polyazo-dyestuffs may be used as such for dyeing leather. Since the 3.3′-dihydroxydiphenylamine is capable of coupling twice, it is possible to obtain valuable higher polyazo-dyestuffs by combining the said polyazo-dyestuffs with a further diazo- or diazoazo-compound which may contain one or more sulfonic acid groups.

The invention also includes an alternative process for making polyazo-dyestuffs of the above constitution, wherein 1 molecular proportion of the tetrazotized diamino-compound is coupled in an acid medium with 1 molecular proportion of a 1-amino-8-hydroxynaphthalene-mono- or disulfonic acid, the diazoazo-compound so obtained is combined with 1 molecular proportion of a diazotized amine and the resulting diazopolyazo-compound is coupled in an alkaline medium with 1 molecular proportion of the azo-dyestuff from 3.3′-dihydroxy-diphenylamine and a sulfonated diazo- or diazoazo-compound.

The invention also includes a further process for making the aforesaid polyazo-dyestuffs, wherein 1 molecular proportion of the tetrazotized diamino-compound is coupled in an acid medium with 1 molecular proportion of a 1-amino-8-hydroxynaphthalene-mono- or disulfonic acid, the diazoazo-compound so obtained is combined in an alkaline medium with 1 molecular proportion of the azo-dyestuff from 3.3′-dihydroxydiphenylamine and a sulfonated diazo- or diazoazo-compound, and the resulting polyazo-dyestuff is coupled with 1 molecular proportion of a diazotized amine.

The invention also includes another process for making the aforesaid polyazo-dyestuffs, wherein 1 molecular proportion of the tetrazotized diamino-compound is coupled in an acid medium with 1 molecular proportion of a 1-amino-8-hydroxynaphthalene-mono- or disulfonic acid, the diazoazo-compound so obtained is combined with 1 molecular proportion of 3.3′-dihydroxy-diphenylamine, and the resulting disazo-dyestuff is coupled with 2 molecular proportions of the same or different diazo- or diazoazo-compound.

The invention also includes another process for making the aforesaid polyazo-dyestuffs, wherein 1 molecular proportion of the tetrazotized diamino-compound is coupled with 1 molecular proportion of a 1-amino-8-hydroxynaphthalene-mono- or disulfonic acid, the diazoazo-compound so obtained is combined with 1 molecular proportion of a diazotized amine, and the resulting diazopolyazo-compound and 1 molecular proportion of a diazo- or diazoazo-compound are coupled simultaneously with 1 molecular proportion of 3.3′-dihydroxy-diphenylamine.

The new dyestuffs are readily soluble in water and are resistant to inorganic and organic acids as well as to alkalies and formaldehyde. They have a great affinity for leather fibers, and dye the various kinds of leather, by drum dyeing, brush dyeing or spray dyeing, deep full tints which vary from violet, dark green over dark blue to black.

In German Patent 566,471 is described a dyestuff of the following constitution

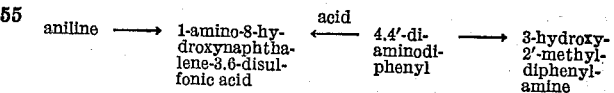

This product, however, cannot be used for dyeing leather on account of its insufficient solubility and its great sensitiveness to acids. Though it is possible to improve the solubility by introducing further sulfonic acid groups into the dyestuff molecule as described in German Patent 582,399, these dyestuffs are precipitated on addition of dilute sulfuric acid. The same applies to the dyestuff described in British Patent 604,831 and having the following constitution:

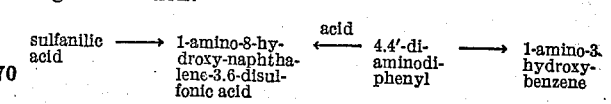

The new dyestuffs obtainable by using 3.3′-dihydroxydiphenylamine are superior to the known dyestuffs mentioned above generally with respect to their resistance to acids. They yield fuller surface dyeings and have much better penetrating and through-dyeing properties than the dyestuff described in British Patent 618,007.

The following examples serve to illustrate the invention but they are not intended to limit it thereto; the parts being by weight unless otherwise stated, and the relationship of parts by weight to parts by volume being the same as that of the kilogram to the liter:

*Example 1*

A tetrazo-solution prepared in the usual manner from 18.4 parts of 4.4′-diaminodiphenyl is combined in an acid medium within 16 hours with 34.1 parts of 1-amino-8-hydroxy-naphthalene-3.6-disulfonic acid (monosodium salt), the excess of the acid being removed by the addition of 3.5 parts of calcium carbonate. To the diazoazo-compound so obtained a diazo-suspension prepared from 17.3 parts of 1-aminobenzene-4-sulfonic acid is added in one portion and 36 parts of anhydrous sodium carbonate are then introduced. After 30 minutes, a weakly alkaline solution of 20.1 parts of 3.3′-dihydroxy-diphenylamine is poured in and the coupling is conducted at a pH-value of 10 by adding 50 parts by volume of a 2 N-solution of sodium hydroxide. After stirring for 4 hours, the mixture is rendered acid with 100 parts by volume of 2 N acetic acid, salted out with sodium chloride, filtered off with suction and dried. The trisazo-dyestuff so obtained corresponds to the following formula:

acid and dyes chrome-tanned leather, by velvet and brush dyeing, deep black tints having a good covering power and very good fastness properties, especially a very good fastness to light.

*Example 3*

18.4 parts of 4.4′-diaminodiphenyl are tetrazotized in the usual manner and the tetrazo solution is combined in an acid medium with 34.1 parts of 1-amino-8-hydroxy-naphthalene-3.6-disulfonic acid (monosodium salt), the excess of the acid being neutralized with 3.5 parts of calcium carbonate. When the coupling is complete, a diazo-suspension prepared from 17.3 parts of 1-aminobenzene-4-sulfonic acid is added in one portion and 150 parts by volume of a 2 N-solution of sodium hydroxide are then introduced to obtain a pH-value of 10. After stirring for 30 minutes, a solution of 10 parts of 3.3′-dihydroxy-diphenylamine in 100 parts by volume of water and 10 parts by volume of a 10 N-solution of sodium hydroxide is then added, the pH-value of the coupling medium being maintained. The mixture is stirred overnight, rendered acid to Congo paper and filtered off with suction. The hexakisazo-dyestuff obtained in the form of a black powder dyes the various kinds of leather deep black tints with a distinctly blue hue which are distinguished by a good fastness to acids, alkalies and formaldehyde and a full covering power.

*Example 4*

184 parts of 4.4′-diamino-diphenyl are tetrazotized in

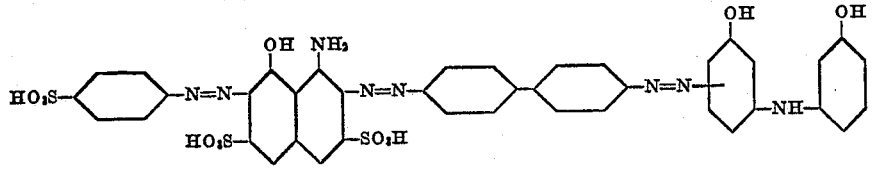

It is readily soluble in water, resistant to sulfuric acid and dyes chrome-tanned leather deep reddish-black tints having a good covering power. The dyeings on bark-tanned leather and on velvet leather are especially valuable. The brush dyeings are distinguished by a very good covering power.

*Example 2*

A tetrazo-solution prepared in the usual manner from 18.4 parts of 4.4′-diaminodiphenyl is combined in an acid medium within 16 hours with 34.1 parts of 1-amino-8-hydroxy-naphthalene-3.6-disulfonic acid (monosodium salt), the excess of the acid being neutralized with 3.5 parts of calcium carbonate. To the diazoazo-compound so obtained a diazo-suspension prepared from 17.3 parts of 1-aminobenzene-4-sulfonic acid is added in one portion and 36 parts of anhydrous sodium carbonate are then introduced. After 30 minutes a weakly alkaline solution of 20.1 parts of 3.3′-dihydroxydiphenylamine is added and the coupling is conducted at a pH-value of 10 in the presence of 50 parts by volume of a 2 N-solution of sodium hydroxide. The trisazo-dyestuff so obtained is stirred overnight. An aqueous diazo-suspension from 17.3 parts of 1-aminobenzene-4-sulfonic acid is then slowly added, while cooling, and the pH-value of the coupling medium is maintained at 10 by the addition of a 2 N-solution of sodium hydroxide. After stirring for 5 hours, the tetrakisazo-dyestuff is rendered acid with acetic acid, the mixture is heated to 90° C., rendered acid to Congo paper by adding 5 N-hydrochloric acid, precipitated with as small a quantity of sodium chloride as possible, filtered off with suction and dried. The grey-black powder so obtained is readily soluble in water, resistant to sulfuric the usual manner and the tetrazo-solution is coupled at a pH-value of 2 with a solution, having an acid reaction to litmus, of 319 parts of 1-amino-8-hydroxynaphthalene-3.6-disulfonic acid, the excess of the acid being neutralized with 35 parts of calcium carbonate. To the diazoazo-compound so obtained a diazo-suspension prepared from 173 parts of 1-aminobenzene-4-sulfonic acid is added at 5° C., and 2000 parts by volume of a 2 N-solution of sodium hydroxide are then introduced so that the coupling is completed at a pH-value of 10. The resulting diazodisazo-compound is combined, while maintaining the pH-value of 10, with the monoazo-dyestuff obtained by coupling in an alkaline medium 201 parts of 3.3′-dihydroxydiphenylamine with the diazo-suspension prepared from 173 parts of 1-aminobenzene-4-sulfonic acid. When the coupling is complete, the tetrakisazo-dyestuff is acidified with 250 parts by volume of 5 N-hydrochloric acid, the mixture is heated to 90° C., precipitated with sodium chloride, filtered off with suction and dried. The resulting dyestuff corresponds with respect to its dyeing and fastness properties with the dyestuff described in Example 2.

*Example 5*

The diazoazo-compound obtainable as described in Example 4 from tetrazotized 4.4′-diamino-diphenyl and 1-amino-8-hydroxy-naphthalene-3.6-disulfonic acid is combined at a pH-value of 10 with the monoazo-dyestuff prepared from the diazo-suspension of 173 parts of 1-aminobenzene-4-sulfonic acid and 201 parts of 3.3′-dihydroxydiphenylamine. The trisazo-dyestuff so obtained is coupled, while maintaining the pH-value of 10, with a diazo-suspension prepared from 173 parts of 1-aminobenzene- 4-sulfonic acid and the product is isolated as described in the foregoing examples. The tetrakisazo-dyestuff dyes the various kinds of leather covered reddish-black tints of good fastness properties.

Example 6

To the diazoazo-compound from tetrazotized 4,4'-diaminodiphenyl and 1-amino-8-hydroxynaphthalene-3.6-disulfonic acid obtainable as described in Examples 1 and 2 a solution of 20.1 parts of 3,3'-dihydroxy-diphenylamine in 20 parts by volume of a 10 N-solution of sodium hydroxide and 200 parts by volume of water is added and a sufficient quantity of a 10 N-solution of sodium hydroxide is then introduced so that the coupling occurs at a pH-value of 10. The disazo-dyestuff so obtained is combined, while cooling, the diazo-suspension prepared from 34.6 parts of 1-aminobenzene-4-sulfonic acid and 200 parts by volume of a 2 N-solution of sodium hydroxide are added simultaneously so that the coupling medium is maintained at a pH-value of 10. The dyestuff is stirred overnight, then rendered acid, heated to 90° C., precipitated with a small quantity of sodium chloride, filtered off with suction and dried. The black powder so obtained is readily soluble in water and dyes the various kinds of leather, by drum dyeing, brush dyeing or spray dyeing, deep black tints of good covering power, very good fastness to light and very good general fastness properties.

Example 7

A tetrazo-solution prepared in the usual manner from 21 parts of 4.4'-diaminostilbene is combined in an acid medium within 16 hours with 34.1 parts of 1-amino-8-hydroxynaphthalene-3.6-disulfonic acid (monosodium salt), the excess of the acid being neutralized with 3.5 parts of calcium carbonate. To the diazoazo-compound so obtained a diazo-suspension from 17.3 parts of 1-aminobenzene-4-sulfonic acid is added in one portion, and 36 parts of anhydrous sodium carbonate are then introduced. After 30 minutes, an alkaline solution of 20.1 parts of 3.3'-dihydroxy-diphenylamine and a sufficient quantity of a 2 N-solution of sodium hydroxide are introduced so that the coupling occurs in a strongly alkaline medium. The trisazo-dyestuff is stirred overnight. While cooling, a diazo-suspension prepared from 17.3 parts of 1-aminobenzene-4-sulfonic acid is slowly added and simultaneously such a quantity of a 2 N-solution of sodium hydroxide that the alkaline reaction of the coupling medium is maintained. After stirring for 5 hours, the tetrakisazo-dyestuff is isolated in the usual manner. The grey-black powder so obtained is readily soluble in water and dyes all kinds of leather by various methods of dyeing deep full black tints having a good covering power, fastness to light and resistance to inorganic and organic acids as well as to formaldehyde and alkalies.

Example 8

0.1 molecular proportion of the trisazo-dyestuff obtainable as described in Example 1 which corresponds to the following constitution

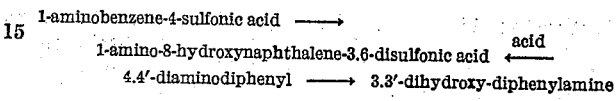

is combined in an alkaline medium with 0.1 molecular proportion of the diazodisazo-compound of the following formula

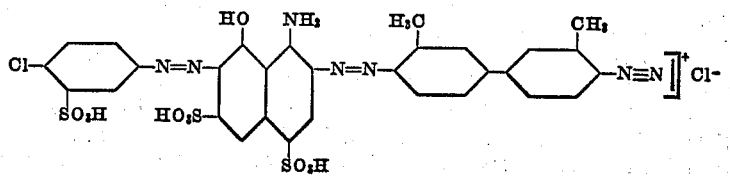

The dyestuff-solution neutralized with acetic acid is heated to 90° C., rendered acid to Congo paper and precipitated with a small quantity of sodium chloride. The dyestuff is obtained in the form of a grey-black powder which is readily soluble in water and dyes the various kinds of leather by drum dyeing, brush dyeing and spray dyeing, bluish black tints of remarkably good fastness properties.

Example 9

0.1 molecular proportion of the diazo-disazo-compound of the following formula

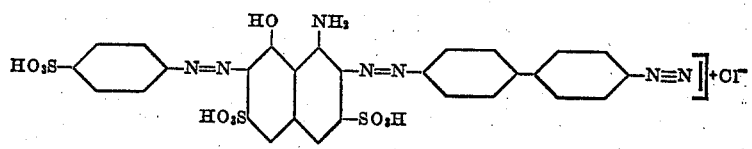

is combined in an alkaline medium with 0.1 molecular proportion of the trisazo-dyestuff obtainable by coupling in an acid medium the diazo-suspension prepared from 17.3 parts of 1-aminobenzene-4-sulfonic acid with 34.1 parts of 1-amino-8-hydroxynaphthalene - 3.6 - disulfonic acid (monosodium salt), subsequently coupling the resulting monoazo-compound in a weakly alkaline medium while cooling, with the tetrazo-solution prepared from 18.4 parts of 4.4'-diaminodiphenyl and finally coupling with an alkaline solution of 20.1 parts of 3.3-'dihydroxy-diphenylamine. The unsymmetrical hexakisazo-dyestuff is isolated as described in Example 8. The grey-black powder so obtained dyes the various kinds of leather greenish blue-black tints of remarkably good resistance to inorganic and organic acids, formaldehyde and alkalies and a very good fastness to light.

Example 10

The alkaline solution of the diazo-disazo-compound which is obtained as described in Example 4 and has the following constitution

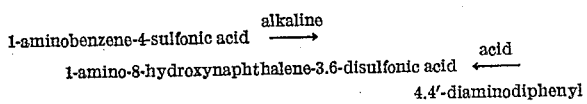

is stirred for ½ hour and then adjusted to a pH-value of 4 by adding the appropriate quantity of a 5 N-solution of hydrochloric acid. After the addition of 60 parts of glacial acetic acid, a solution rendered alkaline with sodium hydroxide of 201 parts of 3.3'-dihydroxy-diphenylamine and 60 parts of glacial acetic acid are added simultaneously drop by drop in the course of 2 hours. Under the buffer action of the sodium acetate which is formed, the coupling to form the trisazo-dyestuff takes place at a pH-value of 4. When the coupling is complete, the trisazo-dyestuff is combined in an alkaline medium with the diazo-suspension prepared from 173 parts of 1-aminobenzene-4-sulfonic acid to form the tetrakisazo-dyestuff which is isolated in the usually manner. The grey-black powder so obtained is readily soluble in water and dyes the various kinds of leather deep black tints having a good fastness to light and resistance to inorganic and organic acids as well as to alkalies and formaldehyde.

Example 11

The diazo-disazo-compound obtainable as described in Example 4 and having the constitution

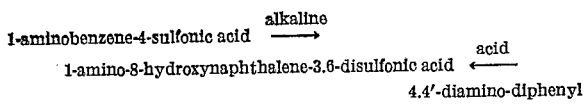

is mixed, while well stirring, with the diazo-suspension prepared from 173 parts of 1-aminobenzene-4-sulfonic acid. Into the mixture so obtained an alkaline solution of 201 parts of 3.3'-dihydroxy-diphenylamine and 100 parts by volume of a 10 N-solution of sodium hydroxide are introduced so that the coupling takes place in a strongly alkaline medium. When the coupling is complete, the tetrakisazo-dyestuff is isolated in the usual manner, filtered off with suction and dried. It dyes the various kinds of leather deep covered black tints of good fastness properties.

In the following table are given a number of further polyazo-dyestuffs of this invention which dye leather similar tints having the same good fastness properties:

| Constitution | Tint |
|---|---|
| 1. 1 - amino - 4 - acetaminobenzene - 2 - sulfonic acid ⟶ 1 - amino - 8 - hydroxynaphthalene - 3.6 - disulfonic acid ⟵ 4.4' - diamino - diphenyl ⟶ 3.3' - dihydroxy - diphenylamine. | blue-black. |
| 2. 1 - amino - 2 - methyl - 3 - chlorobenzene - 5 - sulfonic acid ⟶ 1 - amino - 8 - hydroxynaphthalene - 3.6 - disulfonic acid ⟵ 4.4' - diamino - diphenyl ⟶ 3.3' - dihydroxy - diphenylamine. | black. |
| 3. 4 - amino - 4' - nitrodiphenylamine - 2' - sulfonic acid ⟶ 1 - amino - 8 - hydroxynaphthalene - 3.6 - disulfonic acid ⟵ 4.4' - diamino - diphenyl ⟶ 3.3' - dihydroxy-diphenylamine. | reddish-black. |
| 4. 1 - aminobenzene - 4 - sulfonic acid ⟶ 1 - amino-acid ⟵ 8 - hydroxynaphthalene - 4.6 - disulfonic acid ⟵ 4.4' - diamino - diphenyl ⟶ 3.3' - dihydroxy-diphenylamine. | black. |
| 5. 1 - amino - 4 - methylbenzene - 3 - sulfonic acid ⟶ 1 - amino - 8 - hydroxynaphthalene - 3.6 - disulfonic acid ⟵ 4.4' - diamino - diphenyl ⟶ 3.3'-dihydroxy-diphenylamine. | greenish black. |
| 6. 1 - aminobenzene - 3 - sulfonic acid ⟶ 1 - amino-acid ⟵ 8 - hydroxynaphthalene - 3.6 - disulfonic acid ⟵ 4.4' - diamino - diphenyl ⟶ 3.3' - dihydroxy-diphenylamine. | black. |
| 7. 4 - amino - 1.1' - azobenzene - 4' - sulfonic acid ⟶ 1 - amino - 8 - hydroxynaphthalene - 3.6 - disulfonic acid ⟵ 4.4' - diamino - diphenyl ⟶ 3.3'-dihydroxy-diphenylamine. | blue-black. |
| 8. 2 - aminonaphthalene - 5.7 - disulfonic acid ⟶ 1-amino - 8 - hydroxynaphthalene - 3.6 - disulfonic acid ⟵ 4.4' - diamino - diphenyl ⟶ 3.3' - dihydroxy - diphenyl - amine. | Do. |
| 9. 1 - amino - 3 - chlorobenzene - 4 - sulfonic acid ⟶ 1-amino - 8 - hydroxynaphthalene - 3.6 - disulfonic acid ⟵ 4.4' - diamino - diphenyl ⟶ 3.3' - dihydroxy-diphenylamine. | reddish-black. |
| 10. 1 - amino - 4 - chlorobenzene - 3 - sulfonic acid ⟶ 1 - amino - 8 - hydroxynaphthalene - 3.6 - disulfonic acid ⟵ 4.4' - diamino - diphenyl ⟶ 3.3'-dihydroxy-diphenylamine. | black. |
| 11. chlorotoluidine - sulfonic acids ⟶ 1 - amino - 8 - hydroxynaphthalene - 3.6 - disulfonic acid ⟵ 4.4' - diamino - diphenyl ⟶ 3.3' - dihydroxy-diphenylamine. | reddish-black. |
| 12. 1 - aminonaphthalene - 6 - (7) - sulfonic acid (mixture of Cleve's acids) ⟶ 1 - amino - 8 - hydroxynaphthalene - 3.6 - disulfonic acid ⟵ 4.4' - diamino - diphenyl ⟶ 3.3' - dihydroxy - diphenyl-amine. | bluish-black. |
| 13. 1 - amino - 2 - methyl - 3 - chlorobenzene - 5 - sulfonic acid ⟶ 1 - amino - 8 - hydroxynaphthalene - 3.6 - disulfonic acid ⟵ 4.4'-diamino-diphenyl ⟶ 3.3' - dihydroxy - diphenylamine ⟵ 1 - amino - 2 - methyl - 3 - chlorobenzene - 5 - sulfonic acid. | black. |
| 14. 1 - aminonaphthalene - 6 - (7) - sulfonic acid (mixture of Cleve's acids) ⟶ 1-amino-8-hydroxynaphthalene - 3.6 - disulfonic acid ⟵ 4.4' - diamino - diphenyl ⟶ 3.3'-dihydroxy-diphenylamine ⟵ 1-aminonaphthalene-6-(7)-sulfonic acid (mixture of Cleve's acids). | blue-black. |
| 15. 1 - amino - 4 - methylbenzene - 3 - sulfonic acid ⟶ 1 - amino - 8 - hydroxynaphthalene - 3.6 - disulfonic acid ⟵ 4.4'- diaminodiphenyl ⟶ 3.3'- dihydroxy-diphenylamine ⟵ 1-amino-4-methylbenzene-3-sulfonic acid. | greenish-black. |
| 16. 1-aminobenzene-4-sulfonic acid ⟶ 1-amino-8-hydroxynaphthalene - 4.6 - disulfonic acid ⟵ 4.4'-diamino - diphenyl ⟶ 3.3'- dihydroxy - diphenylamine ⟵ 1-aminobenzene-4-sulfonic acid. | black. |
| 17. 1-aminobenzene-2-sulfonic acid ⟶ 1-amino-8-hydroxynaphthalene-3.6-disulfonic acid ⟵ 4.4'-diamino - diphenyl ⟶ 3.3'- dihydroxy - diphenylamine ⟵ 1 - aminobenzene - 2 - sulfonic acid. | greenish-black. |
| 18. 1-aminobenzene-3-sulfonic acid ⟶ 1-amino-8-hydroxynaphthalene-3.6-disulfonic acid ⟵ 4.4'-diamino - diphenyl ⟶ 3.3'- dihydroxy - diphenylamine ⟵ 1-aminobenzene-3-sulfonic acid. | Do. |
| 19. 1-aminobenzene-4-sulfonic acid ⟶ 1-amino-8-hydroxynaphthalene-3.6-disulfonic acid ⟵ 4.4'-amino - 3.3'- dimethyl - diphenyl ⟶ 3.3'- dihydroxy - diphenylamine ⟵ 1 - aminobenzene -4- sulfoni- acid. | black. |
| 20. 1-aminobenzene-2.5-disulfonic acid ⟶ 1-amino-8-hydroxynaphthalene-3.6-disulfonic acid ⟵ 4.4'-diaminodiphenyl ⟶ 3.3'- dihydroxy-diphenylamine ⟵ 1-aminobenzene-2.5-disulfonic acid. | bluish-black. |
| 21. 1 - amino - 4 - chlorobenzene - 2 - sulfonic acid ⟶ 1 - amino - 8 - hydroxynaphthalene - 3.6 - disulfonic acid ⟵ 4.4' - diamino-diphenyl ⟶ 3.3'-dihydroxy-diphenylamine ⟵ 1 - amino-4-chlorobenzene-2-sulfonic acid. | blue-black. |
| 22. 1 - aminobenzene -4- sulfonic acid ⟶ 1 - amino-8-hydroxynaphthalene - 4 - sulfonic acid ⟵ 4.4'-diaminodiphenyl ⟶ 3.3'-dihydroxy-diphenylamine ⟵ 1 - aminobenzene - 4 - sulfonic acid. | violet. |
| 23. 1 - amino - 3 - nitrobenzene - 4 - sulfonic acid ⟶ 1 - amino - 8 - hydroxynaphthalene - 3.6 - disulfonic acid ⟵ 4.4'-diamono - diphenyl ⟶ 3.3'-dihydroxy-diphenylamine ⟵ 1 - amino - 3 - nitrobenzene-4-sulfonic acid. | blue-black. |

| Constitution | Tint |
|---|---|
| 24. 1 - aminobenzene - 3.5 - disulfonic acid ⟶ 1 - amino-8 - hydroxynaphthalene - 3.6 - disulfonic acid ⟵ 4.4′ - diamino - diphenyl ⟶ 3.3′ - dihydroxy-diphenylamine ⟵ 1 - aminobenzene - 3.5 - disulfonic acid. | greenish-black. |
| 25. 1 - aminobenzene - 4 - sulfonic acid ⟶ 1 - amino-8-hydroxy-naphthalene - 3.6 - disulfonic acid ⟵ 4.4′ - diamino-3.3′ - dinitrodiphenyl ⟶ 3.3′ - dihydroxy-diphenylamine ⟵ 1 - aminobenzene-4-sulfonic acid. | dark green. |
| 26. 4 - amino - 4′ - nitrodiphenylamine - 2′ - sulfonic acid → 1 - amino - 8 - hydroxynaphthalene - 3.6 - disulfonic acid ⟵ 4.4′ - diaminodiphenyl ⟶ 3.3′-dihydroxy-diphenylamine ⟵ 4 - amino - 4′-nitrodiphenylamine-2′-sulfonic acid. | black. |
| 27. 1 - aminobenzene - 4 - sulfonic acid ⟶ 1 - amino-8-hydroxynaphthalene - 3.6 - disulfonic acid ⟵ 4.4′ - diamino - diphenyl ⟶ 3.3′ - dihydroxy-diphenylamine ⟵ 1 - amino - 4 - nitrobenzene. | greenish-black. |
| 28. 4 - amino - 4′ - nitrodiphenylamine - 2′ - sulfonic acid → 1 - amino - 8 - hydroxynaphthalene - 3.6 - disulfonic acid ⟵ 4.4′ - diamino - diphenyl ⟶ 3.3′-dihydroxy - diphenylamine ⟵ 1 - aminobenzene-4 - sulfonic acid. | Do. |
| 29. Aniline ⟶ 1 - amino - 8 - hydroxynaphthalene-3.6 - disulfonic acid ⟵ 4.4′ - diamino - diphenyl ⟶ 3.3′ - dihydroxy - diphenylamine ⟵ aniline. | black. |
| 30. 1-aminobenzene-2.5-disulfonic acid ⟶ 1-amino-8-hydroxynaphthalene-3.6-disulfonic acid ⟵ 4.4′-diamino - diphenyl ⟶ 3.3′ - dihydroxy-diphenylamine ⟵ 1-aminobenzene-2.5-disulfonic acid. | Do. |
| 31. 1-aminobenzene-4-sulfonic acid ⟶ 1-amino-8-hydroxynaphthalene-3.6-disulfonic acid ⟵ 4.4′-diaminostilbene ⟶ 3.3′ - dihydroxy - diphenyl - amine ⟵ 1-aminobenzene-4-sulfonic acid. | Do. |
| 32. 1-aminobenzene-4-sulfonic acid ⟶ 1-amino-8-hydroxynaphthalene-3.6-disulfonic acid ⟵ 4.4′-diamino - 3.3′ - dichlorodiphenyl ⟶ 3.3′ - dihydroxy - diphenylamine ⟵ 1 - aminobenzene - 4 - sulfonic acid. | greenish dark blue. |
| 33. 1-aminobenzene-4-sulfonic acid ⟶ 1-amino-8-hydroxy-naphthalene-3.6-disulfonic acid ⟵ 4.4′-diamino - 3.3′ - dimethoxydiphenyl ⟶ 3.3′ - dihydroxy - diphenylamine ⟵ 1 - aminobenzene-4-sulfonic acid. | violet. |
| 34. 1-aminobenzene-4-sulfonic acid ⟶ 1-amino-8-hydroxy-naphthalene-3.6-disulfonic acid ⟵ 4.4′-diamino - stilbene - 2.2′ - disulfonic acid ⟶ 3.3′-dihydroxy-diphenylamine ⟵ 1-aminobenzene-4-sulfonic acid. | dark green. |
| 35. 1-aminobenzene-4-sulfonic acid ⟶ 1-amino-8-hydroxy-naphthalene-3.6-disulfonic acid ⟵ 4.4′-diamino - diphenylurea ⟶ 3.3′ - dihydroxy - diphenylamine ⟵ 1-aminobenzene-4-sulfonic acid. | dark brown. |
| 36. 1-aminobenzene-4-sulfonic acid ⟶ 1-amino-8-hydroxy-naphthalene-3.6-disulfonic acid ⟵ 4.4′-diamino - benzophenone ⟶ 3.3′ - dihydroxy - diphenylamine ⟵ 1-aminobenzene-4-sulfonic acid. | greenish black. |
| 37. 1-aminobenzene-4-sulfonic acid ⟶ 1-amino-8-hydroxy-naphthalene-3.6-disulfonic acid ⟵ 2.4′-diamino - diphenyl ⟶ 3.3′ - dihydroxy - diphenylamine ⟵ 1-amino-benzene-4-sulfonic acid. | Do. |
| 38. 1-aminobenzene-4-sulfonic acid ⟶ 1-amino-8-hydroxy-naphthalene-3.6-disulfonic acid ⟵ 4.4′-diamino - diphenylether ⟶ 3.3′ - dihydroxy - diphenylamine ⟵ 1-aminobenzene-4-sulfonic acid. | dark green. |
| 39. 1 - aminobenzene - 4 - sulfonic acid ⟶ 1 - amino-8 - hydroxynaphthalene - 3.6 - disulfonic acid ⟵ 4.4′ - diamino - diphenylether - 2.2′ - disulfonic acid ⟶ 3.3′ - dihydroxy - diphenylamine ⟵ 1-aminobenzene-4-sulfonic acid. | dark blue. |
| 40. 1 - aminobenzene - 4 - sulfonic acid ⟶ 1 - amino-8 - hydroxynaphthalene - 3.6 - disulfonic acid ⟵ 4.4′ - diamino - diphenylsulfide ⟶ 3.3′ - dihydroxydiphenylamine ⟵ 1 - aminobenzene - 4 - sulfonic acid. | black. |
| 41. 1 - aminobenzene - 4 - sulfonic acid ⟶ 1 - amino-8 - hydroxynaphthalene - 3.6 - disulfonic acid ⟵ 4.4′ - diamino - diphenylamine ⟶ 3.3′ - dihydroxy - diphenylamine ⟵ 1 - aminobenzene - 4 - sulfonic acid. | blue red. |
| 42. 1 - aminobenzene - 4 - sulfonic acid ⟶ 1 - amino-8 - hydroxynaphthalene - 3.6 - disulfonic acid ⟵ N - paraaminobenzoyl - meta - phenylenediamine ⟶ 3.3′ - dihydroxy - diphenylamine ⟵ 1-aminobenzene-4-sulfonic acid. | greenish black. |
| 43. 1 - aminobenzene - 4 - sulfonic acid ⟶ 1 - amino-8 - hydroxynaphthalene - 3.6 - disulfonic acid ⟵ N - para - aminobenzoyl - para - phenylene diamine ⟶ 3.3′ - dihydroxy - diphenylamine ⟵ 1-aminobenzene-4-sulfonic acid. | reddish black. |
| 44. 1 - aminobenzene - 4 - sulfonic acid ⟶ 1 - amino-8 - hydroxynaphthalene - 3.6 - disulfonic acid ⟵ N - meta - aminobenzoyl - meta - phenylenediamine ⟶ 3.3′ - dihydroxy - diphenylamine ⟵ 1-aminobenzene-4-sulfonic acid. | greenish black. |
| 45. 1 - aminobenzene - 4 - sulfonic acid ⟶ 1 - amino-8 - hydroxynaphthalene - 3.6 - disulfonic acid ⟵ N - meta - aminobenzoyl - para - phenylenediamine ⟶ 3.3′ - dihydroxy - diphenylamine ⟶ 1-aminobenzene-4-sulfonic acid. | brownish-black. |
| 46. 1 - aminobenzene - 4 - sulfonic acid ⟶ 1 - amino-8 - hydroxynaphthalene - 3.6 - disulfonic acid ⟵ 4.4′ - diamino - diphenyl ⟶ 3.3′ - dihydroxy - diphenylamine ⟵ 4 - amino - 1.1′ - azobenzene - 4′-sulfonic acid. | black. |
| 47. 1-aminobenzene-4-sulfonic acid ⟶ 1-amino-8-hydroxynaphthalene-3.6-disulfonic acid ⟵ 4.4′-diamino-diphenyl ⟶ 3.3′-dihydroxy-diphenylamine ⟵ 4.4′-diamino-diphenyl ⟶ 1-amino-8-hydroxynaphthalene-3.6-disulfonic acid ⟵ 1-aminobenzene-4-sulfonic acid. | blue-black. |
| 48. 1-amino-4-chlorobenzene-3-sulfonic acid ⟶ 1-amino - 8 - hydroxynaphthalene - 3.6 - disulfonic acid ⟵ 4.4′-diamino-diphenyl ⟶ 3.3′-dihydroxy-diphenylamine ⟵ 4.4′-diamino-diphenyl ⟶ 1-amino-8-hydroxynaphthalene-3.6-disulfonic acid ⟵ 1-amino-4-chlorobenzene-3-sulfonic acid. | black. |
| 49. 1-aminobenzene-4-sulfonic acid ⟶ 1-amino-8-hydroxynaphthalene-4.6-disulfonic acid ⟵ 4.4′-diamino-diphenyl ⟶ 3.3′-dihydroxy-diphenylamine ⟵ 4.4′-diamino-diphenyl ⟶ 1-amino-8-hydroxynaphthalene-4.6-disulfonic acid ⟵ 1-aminobenzene-4-sulfonic acid. | bluish-black. |
| 50. 1-amino-2-methyl-3-chlorobenzene-5-sulfonic acid ⟶ 1 - amino - 8 - hydroxynaphthalene - 3.6 - disulfonic acid ⟵ 4.4′-diamino-diphenyl ⟶ 3.3′-dihydroxy-diphenylamine ⟵ 4.4′-diamino-diphenyl ⟶ 1-amino-8-hydroxynaphthalene-4.6-disulfonic acid ⟵ 1-amino-2-methyl-3-chlorobenzene-5-sulfonic acid. | blue-black. |
| 51. 1-aminobenzene-4-sulfonic acid ⟶ 1-amino-8-hydroxynaphthalene-4-sulfonic acid ⟵ 4.4′-diamino-diphenyl ⟶ 3.3′-dihydroxy-diphenylamine ⟵ 4-4′-diamino-diphenyl ⟶ 1-amino-8-hydroxynaphthalene-4-sulfonic acid ⟵ 1-aminobenzene-4-sulfonic acid. | violet. |
| 52. 1 - amino - 2 - chlorobenzene - 4 - sulfonic acid ⟶ 1-amino-8-hydroxynaphthalene-3.6-disulfonic acid ⟵ 4.4′-aminodiphenyl ⟶ 3.3′-dihydroxy-diphenylamine ⟵ 4.4′-diamino-diphenyl ⟶ 1-amino-8-hydroxynaphthalene-3.6-disulfonic acid ⟵ 1-amino-2-chlorobenzene-4-sulfonic acid. | black. |
| 53. 1-amino-3-nitrobenzene-4-sulfonic acid ⟶ 1-amino-8 - hydroxynaphthalene - 3.6 - disulfonic acid ⟵ 4.4′- diamino - diphenyl ⟶ 3.3′- dihydroxy - diphenylamine ⟵ 4.4′-diamino-diphenyl ⟶ 1 - amino - 8 - hydroxynaphthalene - 3.6 - disulfonic acid ⟵ 1-aminobenzene-4-sulfonic acid. | bluish-black. |
| 54. 4-amino-1.1′-azobenzene-4′-sulfonic acid ⟶ 1-amino-8-hydroxynaphthalene-3.6-disulfonic acid ⟵ 4.4′-diamino-diphenyl ⟶ 3.3′-dihydroxy-diphenylamine ⟵ 4.4′-diamino-diphenyl ⟶ 1-amino-8-hydroxynaphthalene-3.6-disulfonic acid ⟵ 4-amino-1.1′-azobenzene-4′-sulfonic acid. | Do. |
| 55. 1-aminobenzene-2-carboxylic acid ⟶ 1-amino-8-hydroxynaphthalene-3.6-disulfonic acid ⟵ 4.4′-diamino-diphenyl ⟶ 3.3′-dihydroxy-diphenylamine ⟵ 4.4′- diamino - diphenyl ⟶ 1-amino - 8 - hydroxynaphthalene - 3.6 - disulfonic acid ⟵ 1-aminobenzene-2-carboxylic acid. | dark blue. |
| 56. 1-aminobenzene - 2.5 - disulfonic acid ⟶ 1-amino-8-hydroxynaphthalene-3.6-disulfonic acid ⟵ 4.4′-diamino - diphenyl - 3.3′-dicarboxylic acid ⟶ 3.3′ - dihydroxy - diphenylamine ⟵ 1-aminobenzene-2-carboxylic acid. | blue black. |
| 57. 1-aminobenzene-4-sulfonic acid ⟶ 1-amino-8-hydroxynaphthalene-3.6-disulfonic acid ⟵ 4.4′-diamino-3.3′-diphenoxy acetic acid ⟶ 3.3′-dihydroxy-diphenylamine ⟵ 1-aminobenzene-4-sulfonic acid. | dark blue. |

We claim:
1. Polyazo-dyestuffs corresponding to the following general formula

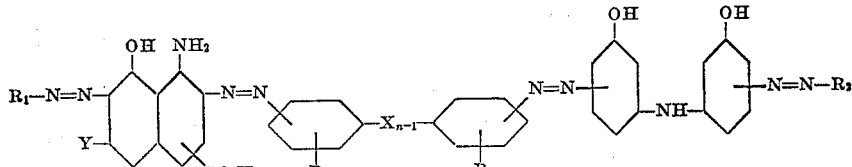

wherein $R_1$ and $R_2$ represent members selected from the group consisting of benzene, sulfobenzene, disulfobenzene, chloro-sulfobenzene, methyl-sulfobenzene, methyl-chloro-sulfobenzene, nitrobenzene, nitro-sulfobenzene, acet-amino-sulfobenzene, carboxybenzene, phenylamino-nitro-sulfobenzene, sulfo-phenylazobenzene, mono-sulfonaphthalene and di-sulfonaphthalene, $R_3$ and $R_4$ are radicals selected from the group consisting of hydrogen, methyl, nitro, chloro, methoxy, sulfo and carboxy radicals, X is a member selected from the group consisting of —CH=CH—, —NH—CO—NH—, —CO—, —O—, —S—, —NH— and —CONH—, $n$ is an integer selected from the group consisting of 1 and 2, and Y is a member selected from the group consisting of hydrogen and the sulfonic acid group.

2. Polyazo-dyestuffs corresponding to the following general formula

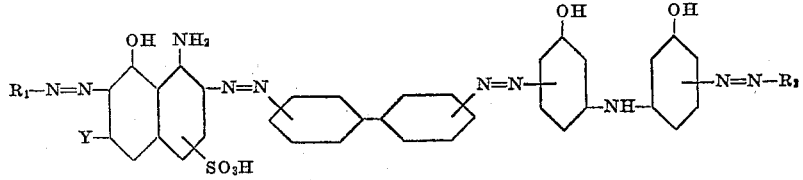

wherein $R_1$ and $R_2$ represent radicals of the benzene series and Y stands for a member of the group consisting of hydrogen and the sulfonic acid group.

3. The polyazo-dyestuff corresponding to the following formula

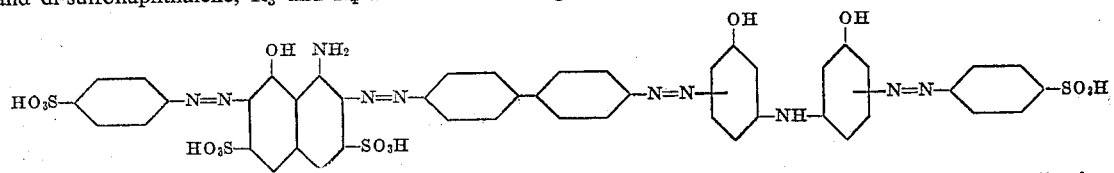

4. The polyazo-dyestuff corresponding to the following formula

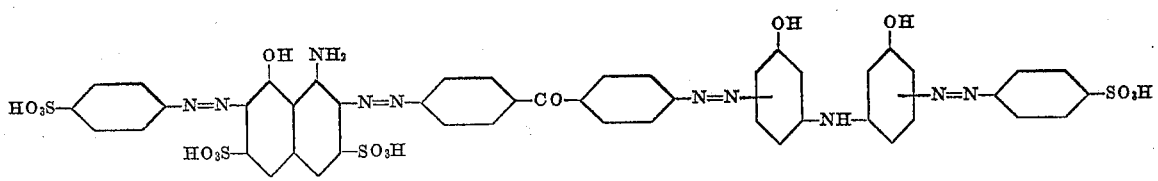

5. The polyazo-dyestuff corresponding to the following formula

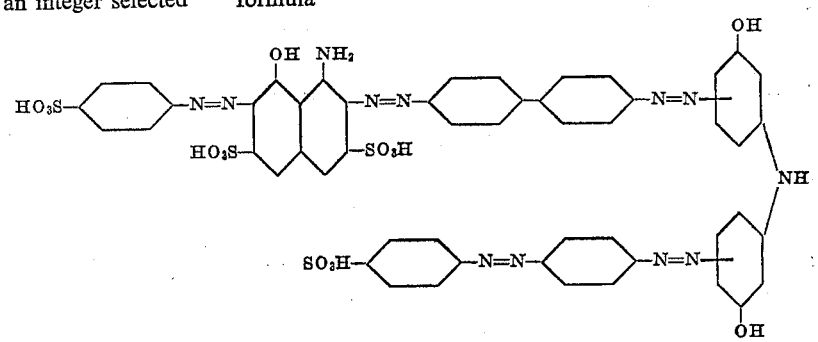

References Cited in the file of this patent
UNITED STATES PATENTS

| | | |
|---|---|---|
| 1,885,609 | Leeman et al. | Nov. 1, 1932 |
| 2,777,838 | Huss et al. | Jan. 15, 1957 |